United States Patent [19]

Besand et al.

[11] 3,961,088

[45] June 1, 1976

[54] METHOD OF PACKAGING FRUIT DRINKS

[75] Inventors: Roy T. Besand, Manchester; Paul L. Carey, St. Louis; David J. Armstrong, Oakville, all of Mo.

[73] Assignee: Ralston Purina Company, St. Louis, Mo.

[22] Filed: June 24, 1974

[21] Appl. No.: 482,108

[52] U.S. Cl.............................. 426/262; 426/330.3; 426/590
[51] Int. Cl.²........................................... A23L 2/00
[58] Field of Search ........... 426/122, 132, 115, 106, 426/324, 268, 392, 415, 410, 269, 262, 263, 330.5, 599, 118, 330.3, 590, 85

[56] References Cited
UNITED STATES PATENTS

| | | | |
|---|---|---|---|
| 1,955,864 | 4/1934 | Stevens | 426/190 |
| 2,628,905 | 2/1953 | Antle et al. | 426/268 |
| 3,598,609 | 8/1971 | Hoynak | 426/190 |

*Primary Examiner*—Raymond N. Jones
*Attorney, Agent, or Firm*—Veo Peoples, Jr.

[57] ABSTRACT

Fruit drinks which contain residual sulfur dioxide will have improved taste and odor and improved vitamin C retension if packaged in a substantially gas permeable container.

7 Claims, No Drawings

METHOD OF PACKAGING FRUIT DRINKS

BACKGROUND OF THE INVENTION

The present invention relates to fruit drinks which contain residual sulfur dioxide and/or sodium bisulfite.

Fruit drinks and fruit juice containing products are known to develop an undesirable brown or dark color in a relatively short period of time when exposed to air, due in part at least to oxidative changes. In the absence of air, fruit juices also turn brown but more slowly, apparently from interreaction of juice constituents, to form dark-colored products.

The latter form of browning is a non-enzymic, anaerobic browning. Although sulfur dioxide is used to effectively retard such browning in "air-tight" systems by reacting with reducing sugars, such use is disadvantageous due to sulfur dioxide's characteristic odor and the fact that it eventually gives rise to a unique and unpleasant off-taste described as "skunky", e.g., U.S. Pat. No. 3,219,458.

The former type of browning is from oxidation, such as would be expected to occur in gas permeable containers. It is generally counteracted by several means for reducing atmospheric oxygen to a very low level at the time of packaging. This is accomplished by purging the container with an oxygen-removing gas and thereafter sealing the container. Accordingly, sulfur dioxide and sulfur dioxide producing compounds, e.g., sodium bisulfite, were heretofore believed to find little utility in such fruit drink systems. In fact, U.S. Pat. No. 2,825,651 teaches that sodium bisulfite, in anhydrous form, does not work by itself as an oxygen remover, and in the hydrated form is too active to handle conveniently. This patent teaches that unless copper sulfate pentahydrate is brought into intimate contact with the sulfites either by grinding or by compression into pellets, oxygen removal is ineffective. Also, U.S. Pat. No. 2,628,905 teaches that sodium bisulfite is so acid that solutions of its salts are too unstable, in giving off sulfur dioxide, which is too offensive for treating air exposed slices of fruits and vegetables unless buffered to a pH of from 5.2 to 6.5. One skilled in the art might believe that these limitations apply equally as well to fruit drinks.

Accordingly, a method of packaging fruit drinks which contain sodium bisulfite and residual sulfur dioxide, unbuffered, and uncombined with oxygen-removal compounds, and without extraneous means for reducing atmospheric oxygen at the time of packaging, yet which effectively inhibits oxidative browning while avoiding an offensive odor or taste would be an unexpected and advantageous advancement of the art.

SUMMARY OF THE INVENTION

It is an object of the present invention to package fruit drinks in an inexpensive, gas permeable container, and yet avoid oxidative browning while simultaneously avoiding use of a conventional oxygen-removal system.

It is a further object of the present invention to provide a packaged, unbuffered fruit drink which contains sodium bisulfite and residual sulfur dioxide yet which does not give rise to an offensive odor or taste.

Briefly, the objects of the invention are fulfilled by packaging a fruit juice containing mixture with sodium bisulfite and residual sulfur dioxide at a pH of about 2.6 to about 3.0 in a gas permeable container.

The theoretical explanation for success of the invention, is not precisely understood. For example, since sodium bisulfite, according to the prior art, was not believed to work as an oxygen-remover by itself, the permeability of the container should give rise to rapid oxidative browning, but it does not. Likewise, unexplainable is the fact that sodium bisulfite even at the low pH of the invention (about 2.6 to about 3.0) does not give rise to the offensive skunky taste or odor, frequently referred to in the prior art. One explanation could be that the permeability of the container allows the sulfur dioxide to escape. However, even this reasoning causes a dilemma because such permeability should by the same token allow atmospheric oxygen to enter and produce a browning effect. Additionally, there is a chance that the sulfites react with reducing sugars thereby preventing amino acid browning but tests have shown that the browning is not caused by amino nitrogen activity in the system.

In an article entitled "Carbonyl Compound in the Non-Enzymic Browning of Lemon Juice", by K. M. Clegg and A. D. Morton, Journal of Science and Food Agriculture, XVI, 1965, pgs. 191–198, Clegg and Morton investigated browning. They found that when the characteristic browning was attributed to solely ascorbic acid, there was an increase in the carbonyl content of lemon juice. The browning increased for approximately 10 days, then polymerization of carbonyl products caused a plateau and even decline of the carbonyl content. The presence of citric and amino acids delayed the peak carbonyl absorption for a week but the visible browning increased. It is significant that sodium bisulfite reaction was one of the confirmatory analyses for carbonyls, but sodium bisulfite was not emphasized as a satisfactory inhibitor of these complex browning steps.

Nevertheless, the objects of this invention are fulfilled as the following description of preferred embodiments will more readily indicate.

DESCRIPTION OF THE PREFERRED EMBODIMENTS

This invention broadly comprehends within its scope the discovery that packaging fruit drinks, which contain sodium bisulfite and residual sulfur dioxide at very low pH's, in gas permeable containers will effectively retard oxidative browning without giving rise to offensive odor or taste in the product.

The fruit drink products of the present invention will contain from 50 to 60% of sugar solids, from 0.005 to 0.050%, preferably 0.020% to 0.025% alkali metal sulfite or bisulfite or 0.003 to 0.03% sulfur dioxide, 0.050 to 0.075% preservatives such as potassium sorbate and sodium benzoate, 0.25% to 2.5% flavoring, 9 to 11% fruit juice concentrate, 0.08 to 0.12% ascorbic acid, 1.4 to 1.5% citric acid, and 33 to 38% water. Generally, in preparing the fruit drinks of the present invention, liquid sugar and alkali metal sulfites, bisulfites, or equivalent proportions of sulfur dioxide and other sulfurous antibrowning agents are mixed with the concentrated fruit juice and various preservatives. Subsequently, an aqueous solution of ascorbic, citric and any other acids are mixed into the product mix, with water, to form the resultant fruit drink.

More specifically, the liquid sugar is any conventional slurry, gel or meal of liquid, solid or amorphous sugar or mixture of sugars utilized in fruit drinks or fruit juice containing products. Preferably, the liquid sugar slurry will contain an effective amount of open-chain aldehydic forms of carbohydrates commonly referred to as reducing sugars. Such an effective amount is capable of reacting with sulfites to form hydrosulfonic acids and thereby augment the antibrowning function. However, it is not essential for purposes of this invention that the reducing sugars be present. The most preferred embodiment of this invention is characterized by a liquid sugar slurry analyzing at from 55 – 58% sucrose, 12 – 15% sugar invert, 30% water, all percentages based on total weight of the slurry, and having 70° Brix solids content.

The preservatives utilized in the process of this invention are any conventional preservatives for fruit juice products such as potassium sorbate and sodium benzoate.

The concentrated fruit juice may be any of several fruit juice mixtures, for example, grapefruit, lemon-lime, grape, orange, cherry, pineapple, etc. The fruit juice is in liquid form and at about 60° to 70° Brix.

Although sodium bisulfite is the preferred sulfur containing compound of the present invention, any edible alkali metal or alkaline earth metal bisulfite would be adequate, as well as sulfur dioxide.

The pH is adjusted to between about 2.6 and about 3.0.

The product is packaged in a gas permeable container. Any reasonably porous plastic container can be utilized such as polystyrene, polyvinylchloride, polyethylene, and Barex*, XT Polymer**, modified ethylene vinyl acetate. Materials having an oxygen barrier measuring as poor as 450 cc mils/100 in$^2$, 24 hours atm. 75°F. were found by this process to inhibit browning to the point of consumer acceptability over a six month storage period. However, it is preferred for purposes of economy and effectiveness to utilize polystyrene containers.

\* A registered trademark of Standard Oil of Ohio
\*\*A registered trademark of American Cynamid The following specific example is illustrative of the process and product of the present invention, but it is to be understood that the invention is not to be limited to the specific details thereof.

EXAMPLE 1

To a mixing tank is added 4,000 pounds (355 gallons) of liquid sugar and agitation is begun. Then 17 pounds of potassium sorbate and 17 pounds of sodium benzoate are dissolved in 10 gallons of water. This solution is added to the mixing tank. Next, 11 pounds 7 ounces sodium bisulfite is dissolved in 5 gallons of water and added to the mixing tank. An additional 32,398 pounds (2,884 gallons) of liquid sugar is metered into the tank, while simultaneously 99 gallons 64 ounces of flavor is also pumped into the tank. Then 500 gallons of 60° Brix concentrated fruit juice is added. Next dissolve 56 pounds 2 ounces of ascorbic acid and 673 pounds 3 ounces citric acid in 250 gallons of water. The solution is pumped to the mixing tank. Allow mixing to continue for an additional 10 minutes. The product is poured directly into polystyrene containers.

What is claimed is:

1. A method of packaging an unbuffered fruit drink which contains an alkali metal bisulfite and residual sulfur dioxide, said method comprising packaging the product at a pH of from about 2.6 to about 3.0 in a substantially gas permeable container having an oxygen barrier of at least 450 cc mils per 100 square inches.

2. The method of claim 1 wherein the substantially gas permeable container is selected from the group consisting of polystyrene, polyvinylchloride, polyethylene and modified ethylene vinyl acetate containers.

3. The method of claim 1 wherein the substantially gas permeable container is a polystyrene container.

4. The combination of an unbuffered fruit drink containing residual sulfur dioxide and ascorbic acid at a pH of from about 2.6 to about 3.0 enclosed in a gas permeable container having an oxygen barrier of at least 450 cc mils per 100 square inch.

5. An improved method of packaging a fruit drink, comprising adding unreacted alkali metal bisulfite to an unbuffered fruit juice mixture and packaging the resultant fruit drink in a gas permeable container having an oxygen barrier of at least 450 cc mils per 100 square inches.

6. The method of claim 5 wherein the container is a polystyrene container.

7. The method of claim 5 wherein the alkali metal bisulfite is sodium bisulfite.

\* \* \* \* \*